Nov. 25, 1952 T. A. FEENEY ET AL 2,619,304
FULL-POWER HYDRAULIC SAFETY SYSTEM
Filed Jan. 9, 1950 5 Sheets-Sheet 5

INVENTORS:
THOMAS A. FEENEY
WARDE L. PARKER
BY Herbert E. Metcalf
ATTORNEY

Patented Nov. 25, 1952

2,619,304

UNITED STATES PATENT OFFICE 2,619,304

FULL POWER HYDRAULIC SAFETY SYSTEM

Thomas A. Feeney and Warde L. Parker, Los Angeles, Calif., assignors to Northrop Aircraft, Inc., Hawthorne, Calif., a corporation of California Application January 9, 1950, Serial No. 137,622

12 Claims. (Cl. 244—85)

This invention relates to fully powered airplane controls, and more particularly to a full power hydraulic control system for airplane attitude control surfaces, having a maximum of safety and simplicity.

In the copending application of Feeney, Serial No. 23,567, filed April 27, 1948, there is shown and claimed a complete control system for operating certain attitude control surfaces of an airplane under power means only, with no surface loads transmitted from the surfaces to the pilot's control elements for those surfaces. In an airplane using such a full power control system, as well as in any other type of system, it is desirable to provide emergency operation of the controls, and it is an object of the present invention to provide a fully powered airplane control system having emergency operating provisions giving adequate safety in the event of a partial or complete failure of the normal power source.

In large airplanes requiring proportionally large surface control forces which become highly impractical if not impossible to be supplied by the pilot, it is useless to provide a pilot control connection for manually moving the surface in case something goes wrong with the power system. In addition, it is desirable from a weight standpoint to eliminate the need for installing two separate complete power systems, holding one of the systems in reserve. Therefore, it is a further object of this invention to provide a full power control system for relatively large airplanes having emergency operating means comprising a minimum amount of equipment and space requirements.

Another problem giving difficulty in the aircraft industry is the presence of free air trapped in hydraulic control systems which, upon reaching a hydraulic cylinder chamber, results in instability of the system. In the case of surface control systems, this air particularly makes itself objectionable in the form of "chatter" of the controlled surface around any instantaneous rest position. This highly undesirable trait is due largely to the compressibility of the trapped air in the actuator attached to the surface, since air is a compressible fluid while hydraulic fluid is substantially incompressible. Extensive air bleeding procedures are commonly necessary to rid the lines and components of air, sometimes even requiring an evacuation operation, prior to filling the lines with hydraulic fluid.

A third object of the present invention, therefore, is to provide a full power control system for airplanes in which air bleeding troubles are eliminated. Other objects and advantages will be apparent from the detailed description forming a part of this specification.

Briefly, the present invention can be practiced using two irreversible hydraulic power units attached to move a single control surface, each power unit being supplied with fluid from a separate and independent hydraulic system, and the controls of the power units are connected in parallel to be simultaneously operated by a single pilot's control member. Additional connecting means between units is provided so that if the individual control connection from the pilot's control to one of the power units becomes inoperative for any reason, that unit will then be operated by movement of the second unit through the interconnection. With this arrangement, control of the airplane will be maintained in the event of failure of either power unit or of either hydraulic system. In order to cover the possibility of complete power failure in both hydraulic systems, an electrically driven stand-by hydraulic pump is provided in one of the hydraulic systems. Means are preferably provided insuring a fluid circulation throughout the system at all times, this circulation continuously removing air entrapped in or entering the system.

Our invention will be more fully understood by reference to the accompanying drawings showing one preferred embodiment thereof, in which.

Figure 1:
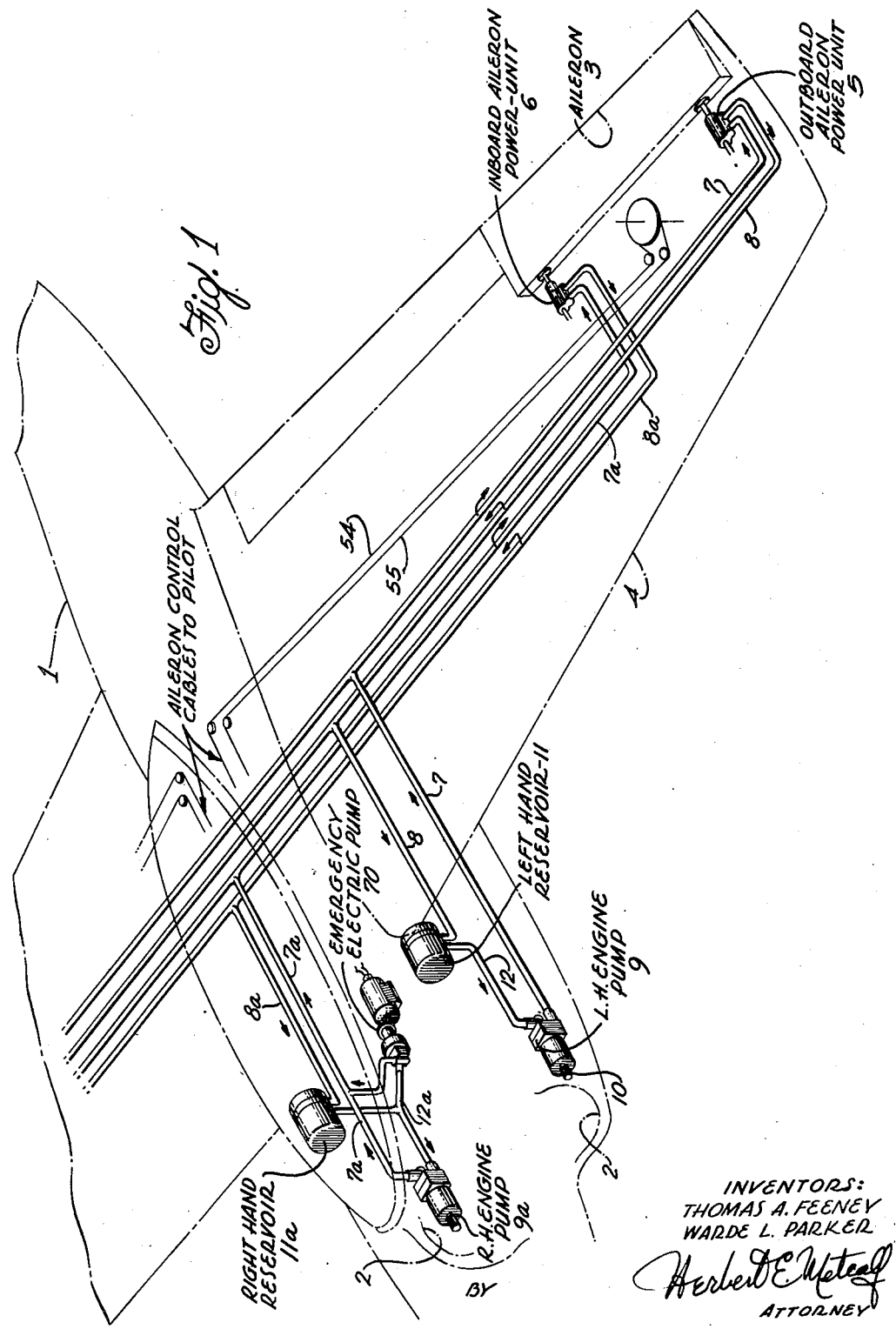
Figure 1 is a perspective view of a twin engine aircraft having an aileron near each wing tip, showing in diagrammatic form the basic elements of a hydraulic power system pressurized by each engine and connected to one of two aileron power units at the aileron.

Referring first to Figure 1 for a description of a specific apparatus utilized to practice this invention, an airplane 1 having two jet engine compartments 2 is provided with an aileron surface 3 near the tip of the left wing panel 4. Two aileron power units 5 and 6 are installed in the wing panel 4 and operatively connected to move the aileron 3 upwardly or downwardly at its trailing edge. These power units will be more fully described later in the description. A hydraulic fluid pressure line 7 and a fluid return line 8 are connected to the outboard power unit 5, and similar lines 7a and 8a are connected to the inboard power unit 6.

Following the outboard connections, the outboard pressure line 7 is connected to the outlet of a left-hand hydraulic pump 9 having a splined shaft 10 for driving by the left-hand power plant (not shown) of the airplane 1. The outboard return line 8 connects to a left-hand hydraulic fluid reservoir 11 which stores fluid for the system. A pump supply line 12 connects the lower side of the left-hand reservoir 11 to the inlet of the left-hand engine driven pump 9. Similarly, the inboard pressure line 7a comes from a right-hand engine driven pump 9a, and the inboard return line 8a leads to a right-hand reservoir 11a connected to the right-hand pump 9a by a second pump supply line 12a.

It is thus seen that the two aileron power units 5 and 6 are fed by two hydraulic systems completely independent of each other. Also connected to be served by the two pairs of hydraulic pressure and return lines mentioned above are two right-hand aileron power units 5a and 6a (Figure 2) connected by functionally identical pairs of pressure and return lines to the same respective system pumps and reservoirs as supply the left-hand aileron power units 5 and 6, so that the left-hand engine-powered hydraulic system furnishes fluid for one aileron power unit on each aileron, and the right-hand system furnishes fluid for the other power unit on each aileron. Other hydraulic system components will be referred to later.

Figure 3:
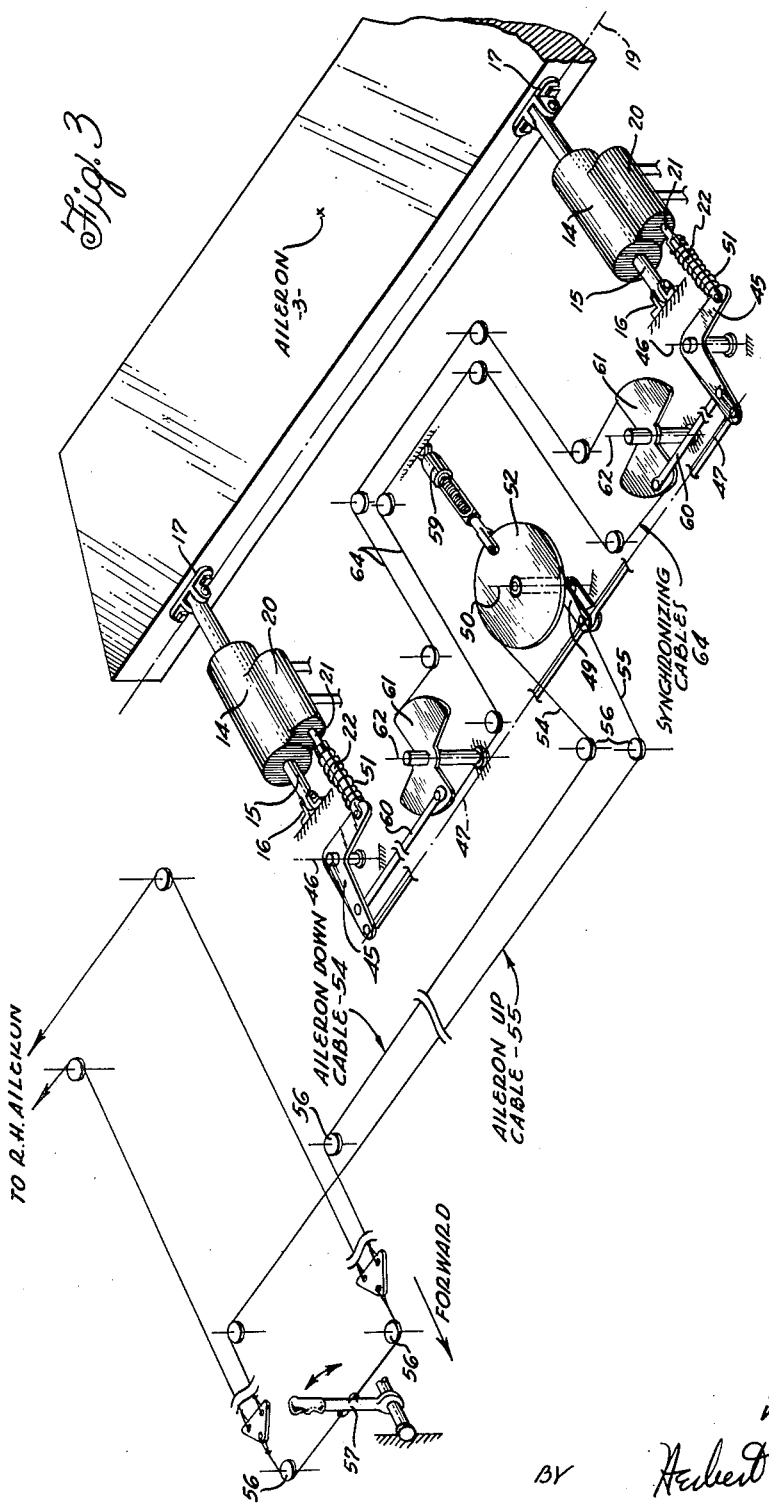
Figure 3 is a perspective view of the aileron power units of Figure 1 connected to the aileron surface and to a diagrammatic control mechanism operated by a pilot's control stick.

As shown in Figure 3, each aileron power unit is composed of an actuating cylinder assembly 14 having its piston rod 15 projecting forwardly and pivotally secured to structural fittings 16 attached in the wing panel 4. The closed end of each cylinder connects directly to an aileron pivot fitting 17 above an aileron hinge line 19. A valve housing 20 is secured to the actuating cylinder or is made an integral part thereof. The valve housing 20 contains a valve assembly 21, the forward end of which protrudes to connect to a valve operating rod 22.

In the actuating cylinder assembly 14 the piston rod 15 carries a piston 24 (Figure 4) operating in a cylinder chamber 25 having cylinder supply ports 26 at each end. Cylinder supply ports 26 lead to outer fluid grooves 27 of the valve assembly 21, which comprises a fixed sleeve 29 and a valve spool 30 sliding within the sleeve 29. Each outer fluid groove 27 connects with the interior of the sleeve 29 by means of radially drilled metering holes 31 located in a staggered pattern lengthwise of the sleeve. A ring of pressure passages 32 through the approximate center of the sleeve 29 communicates with a pressure bore 34 in the valve housing 20 leading to a pressure port 35 to which one of the fluid pressure lines is connected. Opposite one end of the sleeve, a return bore 36 also communicates with the sleeve interior and with a return port 37 connected to one of the return lines.

The valve spool 30 contains a peripheral pressure groove 39 opposite the sleeve pressure passages 32, with a return groove 40 on each side of the pressure groove 39. Metering lands 41 separating these three spool grooves are located opposite the respective sets of sleeve metering holes 31 when the spool 30 is in neutral position, and the spool return grooves 40 connect with an axial spool bore 42 communicating with radial spool end passages 44 by which return fluid reaches the housing return bore 36. Thus, movement of the spool 30 in either direction from neutral causes sequential uncovering of the metering holes 31 to connect one side of the actuating cylinder piston 24 to pressure, through one of the cylinder supply ports 26, and to connect the other side of the piston to return.

The metering lands 41 and holes 31 are spaced and constructed to allow a controlled leakage from the pressure port 35 into both sides of the actuator piston 24 and controlled leakage from both sides of the piston to the return port 37 when the valve is in neutral. This neutral leakage results in equal pressure drops into and out of the cylinder so that balancing pressures are maintained in the cylinder, at neutral, virtually locking the surface solidly in place against shock loads. The particular valve construction shown herein is not per se a claimable part of the present invention, as it forms the subject of a copending application, Serial No. 123,375, filed October 25, 1949.

Referring again to Figure 3, each valve operating rod 22 is pivotally connected to a bell crank 45 rotatable about a fixed axis 46 in the wing panel 4, and a solid linkage 47 connects each bell crank 45 to a common crank arm 49 rotatable about a quadrant axis 50. Each valve operating rod 22 carries an anti-backlash spring 51 which reacts against the bell cranks 45 to remove all backlash from the various rod joints, under normal operating loads. A cable control quadrant 52, fixed to rotate with the crank arm 49, carries an aileron down cable 54 and an aileron up cable 55 on opposite sides thereof, these cables passing over pulleys 56 and coming from a pilot's control stick 57 in the conventional manner. A centering spring assembly 59 connected from a point on the control quadrant 52 to the wing structure provides control stick centering forces.

Also pivotally connected to each bell crank 45 to move in the same direction is a push-pull rod 60 similarly connected to one of two synchronizing quadrants 61 mounted on pivots 62 near each respective end of the aileron 3. The synchronizing quadrants are connected to rotate together by closed circuit synchronizing cables 64, so that when the aileron control cables 54 and 55 move the linkages 47 and the bell cranks 45, the synchronizing cables 64 are constrained to follow this movement.

In actual practice, the linkages 47 may be somewhat complicated, especially if other control connections are made to the aileron control valve assembly, such as an aileron drooping mechanism, for example. It is thus seen that the synchronizing cables actually form a safety device which would drive one or the other valve assemblies if any part of one side of the linkage 47 became inoperative for any reason.

Figure 2:
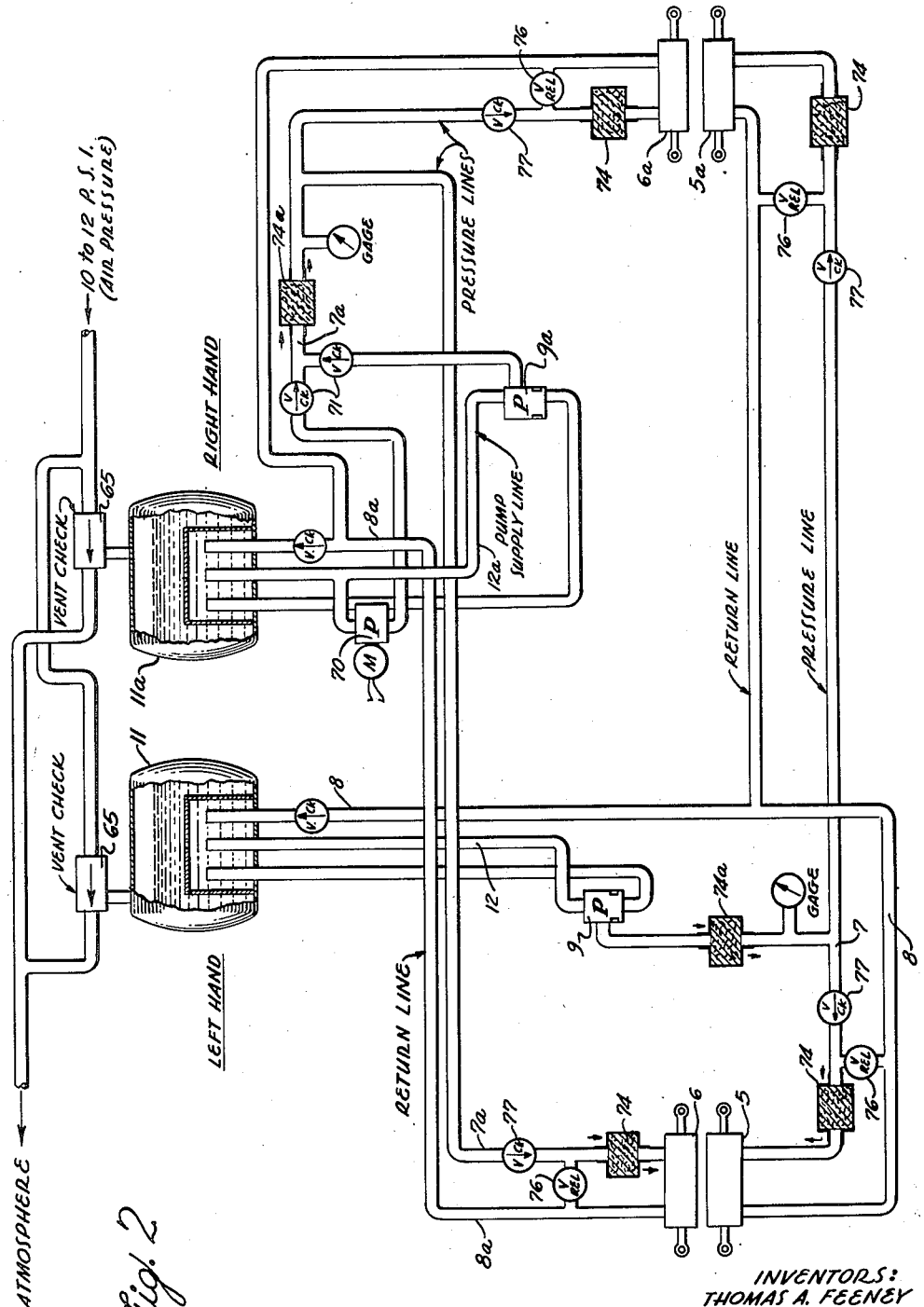
Figure 2 is a schematic diagram showing further details of the hydraulic aileron systems of Figure 1.
Figure 5:
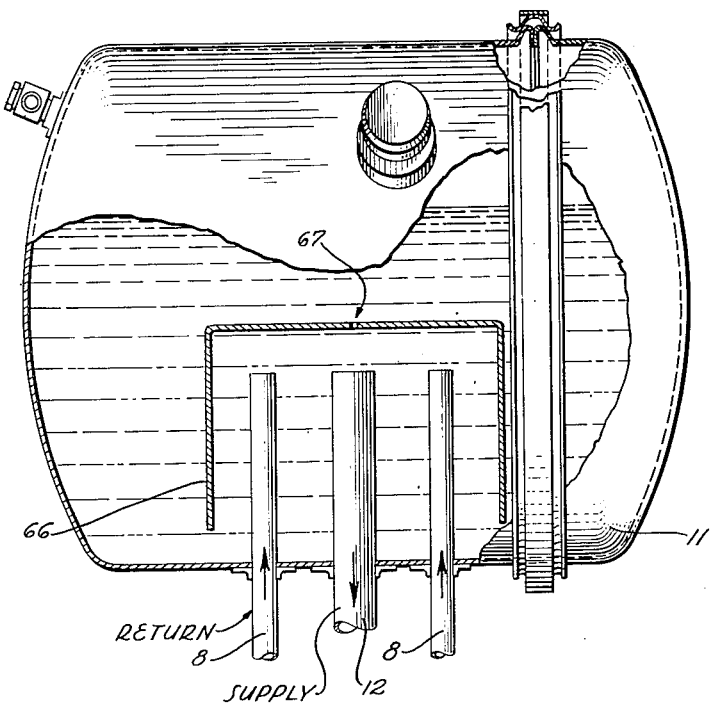
Figure 5 is an elevation view, with part of the outer surface cut away, diagrammatically showing the construction features of a hydraulic reservoir for use in the systems of Figures 1 and 2.

The hydraulic reservoirs 11 and 11a are pressurized, as shown in Figure 2, to insure availability of fluid at the pump inlets. Air, under a pressure of 10 to 12 p. s. i. gage, for example, is supplied to the top of the reservoir through a vent check valve 65 which also includes a relief valve adjusted to exhaust to the atmosphere at a pressure of 12.5 p. s. i., for example. The pump supply line 12 and the return line 8 enter the reservoir 11 from the bottom, as shown in Figure 5, and extend upwardly into the reservoir as standpipes. A baffle assembly 66, secured in the reservoir 11, surrounds the fluid supply and return lines, this baffle being open at its lower edges to fluid in the remainder of the reservoir and containing a small air escape hole 67 in its top surface. In the normal, upright, position of the reservoirs 11, fluid will of course, fill the space within the baffle 66 and thus cover the open ends of the fluid lines. When the reservoir is turned upside down, as during inverted flight, the baffle will remain nearly full of fluid, keeping the lines covered as usual, although the fluid level in the reservoir proper may be below the open ends of the supply and return lines. When inverted, fluid will drain through the air escape hole 67 out of the baffle, but at a slow enough rate to provide several minutes supply of fluid to the system lines, regardless of how much fluid is being pumped through the system for hydraulic uses. Thus, a supply of fluid to the systems is assured for all conditions of flight.

It can now be seen that in the event of failure of one of the hydraulic systems, due to an engine failure or loss of fluid, for example, one actuating cylinder per aileron will still be in normal operating condition, and able to provide aileron control with no trouble at all. Only one-half of the normal maximum force on the surface is available, but this is entirely sufficient to fly and land the airplane with ease. For extreme maneuvers and very large control surfaces, the full power of both units is necessary, however, to give the optimum performance of which the airplane is capable.

In addition to the safety provisions already obtained by the present invention, a stand-by source of hydraulic power is also provided, to take care of emergencies when all the engines quit, for example. As shown in Figures 1 and 2, an electrically driven hydraulic pump assembly 70 is connected between the right-hand engine pump supply line 12a from one reservoir and the right-hand, or inboard, pressure line 7a. Two check valves 71 are provided, one in the engine pump outlet line and one in the emergency pump outlet line, before the two merge into the main pressure line 7a. By reason of these check valves, loss of fluid from an operative system through breaks in the other system, only, is prevented. The airplane's batteries can run the emergency pump 70 during the period of time the airplane is capable of remaining airborne with all engines out.

Two electrically driven emergency pumps may be installed, one in each system, if desired, but the single installation, as described herein, is preferred since it is able to supply sufficient power for emergency control.

In the complete airplane hydraulic system, it is preferable to have the emergency pump 70 supply only the basic flight control system and to include separate emergency means for other components, such as landing gear and flaps. This emergency pump 70 can be installed in either the left-hand or the right-hand system of the two systems shown herein.

Figure 4:
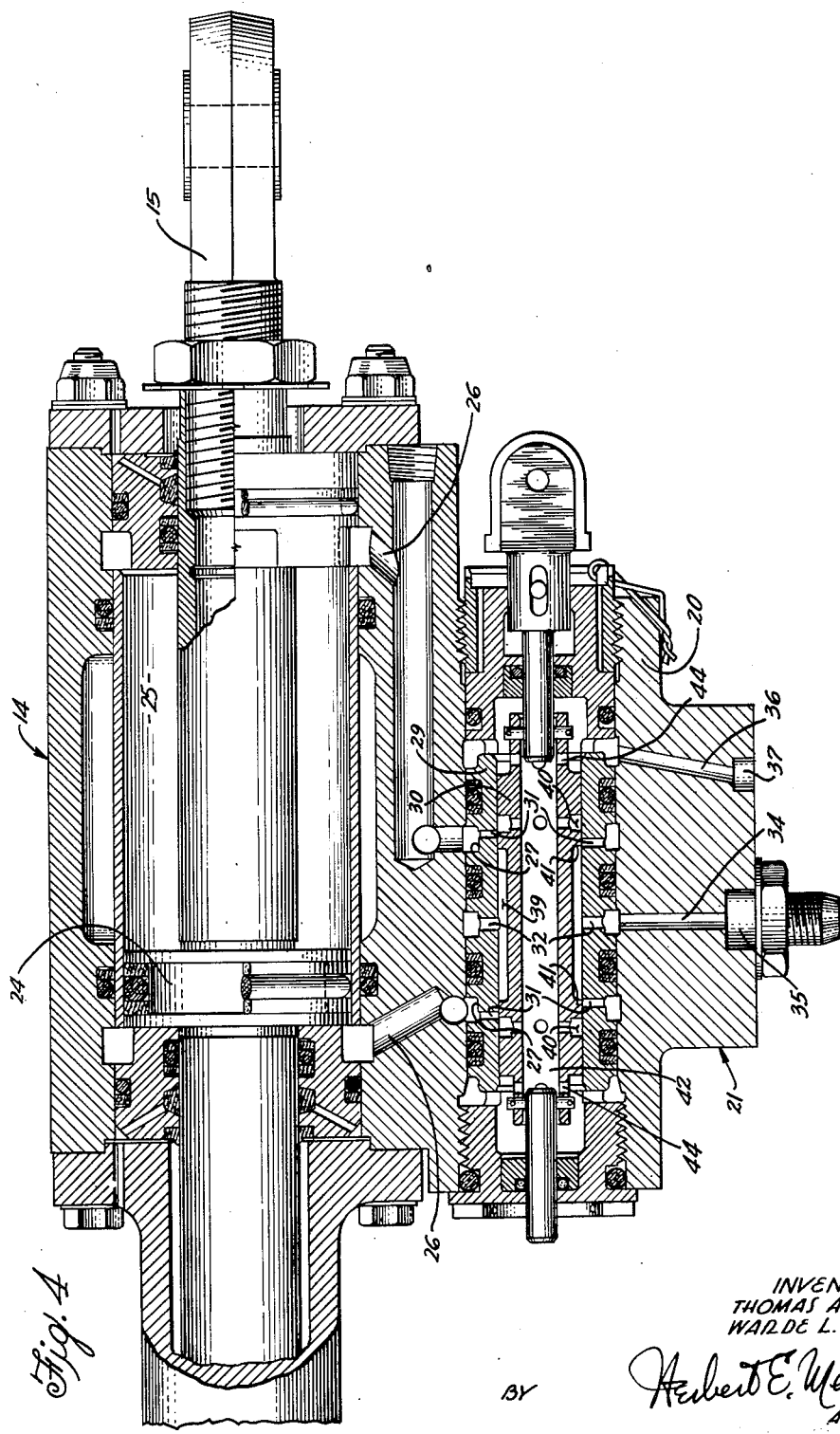
Figure 4 is a longitudinal section view of one hydraulic aileron power unit, showing the internal cylinder and control valve construction.

With regard to eliminating instability troubles due to the presence of air which might enter the components of this control system, several important features should be noted. In Figure 4, it is seen that in the actuating cylinder assembly, the piston 24 is designed to bottom against the end of the cylinder chamber 25 at both ends of its stroke. Thus, there is practically no space in which air could remain trapped after operating the control system once through its entire range. In addition, since the control valve provides neutral leakage into the cylinder on both sides of the piston, a preload pressure is always present to keep any air compressed to a minimum. In this particular instance, a system pressure of 3,000 p. s. i. is used, and a preload pressure of about 1,500 p. s. i. exists in the cylinder at neutral.

In a control system not having this neutral leakage feature, the cylinder pressure at any rest position of the control surface is substantially zero. Therefore, any trapped air renders the surface easily movable back and forth around this rest position due to compressibility of the air. Total compressibility of this air can be lowered in two ways: one, by reducing the volume of air, and the other, by increasing the pressure. Efforts to evacuate or otherwise remove as much air as possible from the system utilize the first of these ways, while the present invention utilizes the second, and does it automatically through inherent design. The effects of increasing the pressure are preferred over the first method, since the resultant system as described herein has been found to be actually insensitive to free air included with the fluid.

To illustrate this point further, it will be well to consider a test made with our invention, using a system pressure of 3,000 p. s. i. as usual. In this test, air was purposely introduced into the pump suction line to determine its effects. The surface was operated back and forth under a load equivalent to that occurring during landing of the aircraft. This was continued until the working medium became approximately 50% hydraulic fluid and 50% air. During the entire test, the surface continued to operate smoothly with no chatter or vibration and responded equally as well as with no air in the actuating cylinder, although there was considerable noise from the pump. At this point, the air and fluid resembled an emulsion, and the reservoir was entirely filled with the frothy mixture. The air supply was then shut off, and the system kept in operation. As the control surface movement was continued, separation of the air and fluid began, until after several more complete cycles, the air was all carried back, by the neutral leakage and the operating return flow, to the top of the reservoir above the fluid level, thus automatically being purged from the lines, pump, and actuating cylinders. The controls and the surface operated with complete normality and showed no evidence of instability throughout this test, and established the already observed fact that air in the system gave no trouble from a performance standpoint.

The present system is also safe from danger resulting from the possibility of foreign material such as filings and chips getting into the fluid and jamming the valve spool 30 in the valve assembly 21. Jamming in any position except neutral will result in the surface being moved to the hard over position. One step in solving this problem was the provision of a secondary filter 14 (Figure 2) located in the fluid pressure line as close to each control valve as possible. These filters are in addition to main system filters 74a located relatively close to the pumps, and are for the purpose of picking up particles which might enter the system between the main filters 74a and the control valves as a result of maintenance operations.

Figure 6:
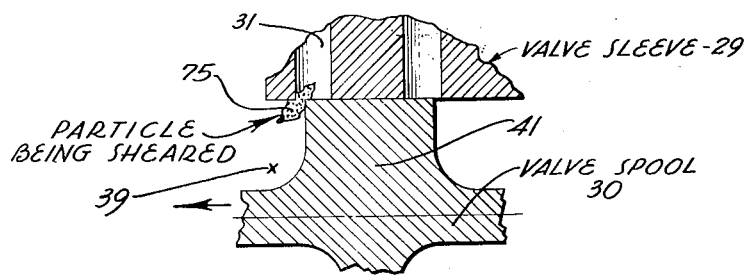
Figure 6 is a sectional view of an enlarged portion of the valve assembly in Figure 5, showing a piece of foreign matter being sheared in two in one of the fluid passages.

A second step was to employ a valve which, rather than providing one large area wedge-shaped orifice which might be easily jammed by a particle, instead will utilize a series of small drilled holes in one valve part which are uncovered and covered in sequence by a sharp edge of another, relatively moving, valve part. The surfaces of these valve parts are hardened to a greater hardness than that of any other metal in the system. As a result, large particles cannot enter the metering holes 31 in the valve, and those which can are small enough to be sheared off by forces developed by the pilot. This shearing action of a foreign particle 75 is illustrated in Figure 6. In practice, it has been found that a piece of steel inserted through a metering hole 31 into a spool groove 39 is sheared off between the edge of the metering land 41 and the inner corner of the metering hole 31 when the valve spool 39 is moved under the required force, without damaging the valve or interfering with the operation thereof.

In our control system, referring again to Figure 2, individual pressure relief valves 76 are installed near each aileron actuating cylinder assembly 14 for the purpose of accurately maintaining the desired pressure right at its power output. The installation of other hydraulic apparatus not shown herein, which may become desirable, such as thermal reliefs, bypass valves, accumulators, drains, and the like, is deemed to lie within the knowledge of persons skilled in the art. Pressure line check valves 77, located near the aileron power units, are provided to eliminate any significant movement of a surface which a gust of wind might cause if occurring when the control valve is open and when no system pressure is present, as when the airplane is parked or moored. The most a surface could possibly be moved in this instance is the amount corresponding to a resulting movement of the valve housing 20 of about ⅛ inch, at which position the valve assembly 21 would be closed by normal follow-up action of the cylinder and valve, and further movement would open the cylinder chamber being reduced, in volume, to the pressure line 7 wherein a check valve 77 is located. Thus the system eliminates the need of control surface locks on the ground.

It is again pointed out that flutter, chatter, and the like, are eliminated by the use of the present invention. This results in a considerable weight saving over other systems. For example, a very thorough weight analysis was made on the airplane represented herein in which the full powered controls were compared with manual controls and with power boosted controls necessary to do the same job. It was found that the full powered controls were 356 pounds lighter than manual controls, and 738 pounds lighter than power boosted controls. Furthermore, none of the systems constructed in accordance with the principles of this invention, and used in flight on five different aircraft designs, has ever been unstable, and the performance of the systems in every case has been entirely satisfactory.

Although the present invention has been shown as applied to a conventional airplane having tail surfaces, it is evident that the principles taught herein can be equally well applied to an all-wing type airplane having all its control surfaces on the trailing edge of the wing, since the two power units per surface would then be installed on each elevon, or combination elevator and aileron. Any other control surface, regardless of its function or operation, can be similarly provided with the control system of this invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A fully powered aircraft control system comprising a control surface to be moved, two hydraulic actuating cylinder and piston asssemblies connected to move said surface, a valve assembly for control of each of said actuating assemblies, each of said valve assemblies comprising a casing element and a spool element slidable in said casing element, two hydraulic control lines between each valve assembly and its respective actuating assembly, two hydraulic operating connections to each of said valve assemblies, said elements being connected to admit fluid from a source of fluid under pressure to cause a differential pressure on opposite sides of said piston upon relative movement of said casing and spool elements away from a neutral position, whereby said surface is moved, one of said elements being connected to move with said surface in a direction tending to neutralize said spool element in said casing element, a first independent hydraulic supply and return system connected to the operating connections of one of said valve assemblies, a second independent hydraulic supply and return system connected to the operating connections of the other valve assembly, a linkage connecting said two spool elements to move synchronously, a pilot's control member, an operating connection between said pilot's control member and said linkage for simultaneous operation of said two valve assemblies, said casing and spool elements provided with neutral leakage passages positioned to allow a highly restricted fluid flow into and out of said cylinders on both sides of said pistons when said elements are in said neutral position, and wherein said actuating cylinder and piston assemblies have a predetermined stroke length providing piston bottoming at each end of said stroke, whereby operation of said control surface is rendered insensitive to the presence of air mixed with said fluid and whereby trapped air is automatically bled from said actuating assemblies.

2. A fully powered control system for moving an aircraft control surface in accordance with the direction, extent, and rate of movement of a pilot's control, which comprises two hydraulic power units connected to move said surface, two independent hydraulic supply and return systems, first power unit servo control means connected to one of said hydraulic systems and having an irreversible driving connection with one of said power units when energized by said connected hydraulic system, second power unit servo control means connected to the other hydraulic system and having a similar irreversible driving connection with the other power unit, a linkage connecting said two servo control means to move synchronously, said linkage being adapted to be connected to said pilot's control for simultaneous operation of said two control means, and an additional synchronizing linkage connected between said two servo control means independent of said first mentioned linkage, said additional linkage being connected and adapted to drive either of said two control means by movement of the other control means.

3. A fully powered control system for moving an aircraft control surface in accordance with the direction, extent, and rate of movement of a pilot's control, which comprises two hydraulic power units connected to move said surface, two independent hydraulic supply and return systems, first power unit servo control means connected to one of said hydraulic systems and having an irreversible driving connection with one of said power units when energized by said connected hydraulic system, second power unit servo control means connected to the other hydraulic system and having a similar irreversible driving connection with the other power unit, a linkage connecting said two servo control means to move synchronously, said linkage being adapted to be connected to said pilot's control for simultaneous operation of said two control means, and at least one of said hydraulic supply and return systems including a normal fluid supply pump operatively connected in a fluid supply line, an emergency fluid pump, normally inactive, also connected in said fluid supply line, in parallel with said normal fluid pump, and wherein an additional synchronizing linkage is connected between said two servo control means independent of said first mentioned linkage, said additional linkage being connected and adapted to drive either of said two control means by movement of the other control means.

4. A fully powered aircraft control system comprising a control surface to be moved, two hydraulic actuating cylinder and piston assemblies connected to move said surface, a valve assembly for control of each of said actuating assemblies, each of said valve assemblies comprising a casing element and a spool element slidable in said casing element, two hydraulic control lines between each valve assembly and its respective actuating assembly, two hydraulic operating connections to each of said valve assemblies, said elements being connected to admit fluid from a source of fluid under pressure to cause a differential pressure on opposite sides of said piston upon relative movement of said casing and spool elements away from a neutral position, whereby said surface is moved, one of said elements being connected to move with said surface in a direction tending to neutralize said spool element in said casing element, a first independent hydraulic supply and return system connected to the operating connections of one of said valve assemblies, a second indepedent hydraulic supply and return system connected to the operating connections of the other valve assembly, a linkage connecting said two spool elements to move synchronously, a pilot's control member, an operating connection between said pilot's control member and said linkage for simultaneous operation of said two valve assemblies, fluid paths provided in each of said valve assemblies by said casing and spool element connections consisting of series of staggered metering holes in one of said elements and sharp cornered grooves in the other element, said metering holes being positioned to be sequentially uncovered by movement of said spool element away from said neutral, and wherein said casing and spool elements are surface hardened to enable shearing off of any foreign particle small enough to enter said metering holes, whereby said valve assemblies are not subject to jamming by foreign particles entering said fluid.

5. A fully powered aircraft control system comprising a control surface to be moved, two hydraulic actuating cylinder and piston assemblies connected to move said surface, a valve assembly for control of each of said actuating assemblies, each of said valve assemblies comprising a casing element and a spool element slidable in said casing element, two hydraulic control lines between each valve assembly and its respective actuating assembly, two hydraulic operating connections to each of said valve assemblies, said elements being connected to admit fluid from a source of fluid under pressure to cause a differential pressure on opposite sides of said piston upon relative movement of said casing and spool elements away from a neutral position, whereby said surface is moved, one of said elements being connected to move with said surface in a direction tending to neutralize said spool element in said casing element, a first independent hydraulic supply and return system connected to the operating connections of one of said valve assemblies, a second indepedent hydraulic supply and return system connected to the operating connections of the other valve assembly, a linkage connecting said two spool elements to move synchronously, a pilot's control member, an operating connection between said pilot's control member and said linkage for simultaneous operation of said two valve assemblies, each of said hydraulic supply and return systems including a fluid supply pump having inlet and outlet connections, a fluid supply reservoir having outlet and inlet connections, a pump suction line connecting said reservoir outlet connection to said pump inlet connection, said pump outlet connection and said reservoir inlet connection being respectively connected to said hydraulic operating connections at one of said valve assemblies, and a source of regulated air pressure connected to the interior of said reservoir above the liquid level therein.

6. A fully powered aircraft control system comprising a control surface to be moved, two hydraulic actuating cylinder and piston assemblies connected to move said surface, a valve assembly for control of each of said actuating assemblies, each of said valve assemblies comprising a casing element and a spool element slidable in said casing element, two hydraulic control lines between each valve assembly and its respective actuating assembly, two hydraulic operating connections to each of said valve assemblies, said elements being connected to admit fluid from a source of fluid under pressure to cause a differential pressure on opposite sides of said piston upon relative movement of said casing and spool elements away from a neutral position, whereby said surface is moved, one of said elements being connected to move with said surface in a direction tending to neutralize said spool element in said casing element, a first independent hydraulic supply and return system connected to the operating connections of one of said valve assemblies, a second independent hydraulic supply and return system connected to the operating connections of the other valve assembly, a linkage connecting said two spool elements to move synchronously, a pilot's control member, an operating connection between said pilot's control member and said linkage for simultaneous operation of said two valve assemblies, each of said hydraulic supply and return systems including a fluid supply pump having inlet and outlet connections, a fluid supply reservoir having inlet and outlet connections entering the bottom of said reservoir and extending upwardly within said reservoir as standpipes, a pump suction line connecting said reservoir outlet connection to said pump inlet connection, said pump outlet connection and said reservoir inlet connection being respectively connected to said hydraulic operating connections at one of said valve assemblies, a baffle secured in said reservoir to form an inverted auxiliary reservoir surrounding said standpipes and having fluid passage space between the baffle lower edges and the bottom of said supply reservoir, and an air bleed hole in the upper surface of said baffle, whereby said reservoir inlet and outlet connections are assured of fluid supply during a predetermined interval of inverted flight of said aircraft.

7. In an airplane having a wing panel on each side thereof with a movable control surface located on each wing panel, a full power surface control system comprising two hydraulic power units connected to move each of said control surfaces, two independent hydraulic power systems, each having a pressure supply line and a fluid return line, separate servo control means for each of said power units, each servo control means having an irreversible driving connection with its respective power unit when energized from a hydraulic power source, one of said servo control means for each surface operatively connected, in parallel, to the pressure and return lines of one of said hydraulic systems, the other servo control means for each surface operatively connected, in parallel, to the pressure and return lines of the other hydraulic system, and a linkage connecting both servo control means for the same surface to move synchronously, said linkages being adapted to be connected to a pilot's control member for simultaneous operation of said two control surfaces.

8. In an airplane having a wing panel on each side thereof with a movable control surface located on each wing panel, a full power surface control system comprising two hydraulic actuating cylinder and piston assemblies connected to move each of said surfaces, a valve assembly for control of each of said actuating assemblies, each of said valve assemblies comprising a casing element and a spool element slidable in said casing, two hydraulic control lines between each valve assembly and its respective actuating assembly, two hydraulic operating connections to each of said valve assemblies, said elements in each valve being connected to admit fluid from a source of fluid under pressure to cause a differential pressure on opposite sides of its respective piston upon relative movement of said casing and spool elements away from a neutral position, whereby its respective surface is moved, one of said elements in each valve being connected to move with its respective surface in a direction tending to neutralize said spool element in said casing element, a first independent hydraulic supply and return system operatively connected to the operating connections of one of said valve assemblies for each of said control surfaces, a second independent hydraulic supply and return system operatively connected to the operating connections of the other valve assembly for each of said control surfaces, a linkage connecting both spool elements for the same surface to move synchronously, a pilot's control member, and an operating connection between said pilot's control member and each of said linkages for simultaneous movement of said two control surfaces.

9. Apparatus in accordance with claim 8 wherein said casing and spool elements are provided with neutral leakage passages positioned to allow a highly restricted fluid flow into and out of said cylinders on both sides of said pistons when said elements are in said neutral position, and wherein said actuating cylinder and piston assemblies have a predetermined stroke length providing piston bottoming at each end of said stroke, whereby operation of said control surfaces is rendered insensitive to the presence of air mixed with said fluid and whereby trapped air is automatically bled from said actuating assemblies.

10. Apparatus in accordance with claim 8 wherein at least one of said hydraulic supply and return systems includes a normal fluid supply pump operatively connected in a fluid supply line, said pump having a driven connection with a power plant in said airplane, and an electrically driven emergency fluid pump, normally inactive, also connected in said fluid supply line, in parallel with said normal fluid pump.

11. In a full powered hydraulic airplane surface control system wherein a piston type hydraulic motor is connected to move said surface in accordance with pilot initiated movements of a valve connected to said motor and to a source of hydraulic fluid under pressure, means for removing air from said system comprising a reservoir connected to receive the return flow from said valve, and connected to supply fluid to said pressure source, an air outlet in said reservoir, and means in said valve forming a passageway for a predetermined minimum flow of fluid at all times from said source through said valve and motor into said reservoir, whereby air in said system is continuously carried to said reservoir for discharge through said air outlet.

12. In a full powered hydraulic airplane surface control system wherein a piston type hydraulic motor is connected to move said surface in accordance with pilot initiated movements of a valve connected to said motor and to a source of hydraulic fluid under pressure, means for removing air from said system comprising a reservoir connected to receive the return flow from said valve, and connected to supply fluid to said pressure source, an air outlet in said reservoir, means in said valve forming a passageway for a predetermined minimum flow of fluid at all times from said source through said valve and motor into said reservoir, whereby air in said system is continuously carried to said reservoir for discharge through said air outlet, and means for maintaining a predetermined air pressure between said air outlet and the fluid in said reservoir.

THOMAS A. FEENEY.
WARDE L. PARKER.

REFERENCES CITED

The following references are of record in the file of this patent:

UNITED STATES PATENTS

| Number | Name | Date |
|---|---|---|
| 2,103,530 | Henry | Dec. 28, 1937 |
| 2,484,908 | Purcell | Oct. 18, 1949 |
| 2,512,119 | Stone et al. | June 20, 1950 |

FOREIGN PATENTS

| Number | Country | Date |
|---|---|---|
| 360,458 | Great Britain | Nov. 2, 1931 |
| 582,380 | Great Britain | Nov. 13, 1946 |